United States Patent
DeLuca et al.

(10) Patent No.: US 10,698,582 B2
(45) Date of Patent: Jun. 30, 2020

(54) CONTROLLING VOICE INPUT BASED ON PROXIMITY OF PERSONS

(71) Applicant: International Business Machines Corporation, Armonk, NY (US)

(72) Inventors: Lisa Seacat DeLuca, Baltimore, MD (US); Maharaj Mukherjee, Poughkeepsie, NY (US); Jonathan Lenchner, Nairobi (KE)

(73) Assignee: International Business Machines Corporation, Armonk, NY (US)

(*) Notice: Subject to any disclaimer, the term of this patent is extended or adjusted under 35 U.S.C. 154(b) by 184 days.

(21) Appl. No.: 16/021,348

(22) Filed: Jun. 28, 2018

(65) Prior Publication Data

US 2020/0004396 A1    Jan. 2, 2020

(51) Int. Cl.

| | |
|---|---|
| *G06F 3/0484* | (2013.01) |
| *G06F 3/16* | (2006.01) |
| *G10L 15/20* | (2006.01) |
| *G06F 21/60* | (2013.01) |
| *G06F 3/0481* | (2013.01) |
| *G06F 21/32* | (2013.01) |
| *G10L 15/22* | (2006.01) |
| *G06F 16/9537* | (2019.01) |

(52) U.S. Cl.
CPC .......... *G06F 3/0484* (2013.01); *G06F 3/0481* (2013.01); *G06F 3/167* (2013.01); *G06F 16/9537* (2019.01); *G06F 21/32* (2013.01); *G06F 21/604* (2013.01); *G10L 15/20* (2013.01); *G10L 15/22* (2013.01)

(58) Field of Classification Search
CPC .. G06F 3/04812; G06F 3/0488; G06F 3/0484; G06F 3/167; G06F 16/955; G06Q 30/0617; H04N 5/44513; H04N 21/2665; G10L 15/20; G10L 15/22
See application file for complete search history.

(56) References Cited

U.S. PATENT DOCUMENTS

| | | |
|---|---|---|
| 7,383,189 B2 | 6/2008 | Halonen et al. |
| 7,983,920 B2 | 7/2011 | Sinclair, II |
| 8,849,791 B1 * | 9/2014 | Hertschuh .......... G06Q 30/0617 707/713 |
| 2005/0027538 A1 | 2/2005 | Halonen et al. |
| 2010/0306249 A1 * | 12/2010 | Hill .................. G06Q 30/02 707/769 |

(Continued)

OTHER PUBLICATIONS

"Turn Voice Input On / Off—Android", Verizon Wireless, https://www.verizonwireless.com/support/knowledge-base-205091, retrieved from Internet Jan. 17, 2018, 2 pages.

*Primary Examiner* — Steven P Sax
(74) *Attorney, Agent, or Firm* — Anthony V. England; Edell, Shapiro & Finnan, LLC

(57) ABSTRACT

Methods, systems, and computer program products are provided for presenting a user interface on a display of a computer system. A presence of a second person in a proximity of a computer system other than a first person using the computer system is determined. A user interface is automatically selected based on the determined presence of the second person. In an absence of the second person, a voice interface is selected. When the second person is present, a text entry interface is selected. The selected user interface is presented to the first person on a display of the computer system.

8 Claims, 10 Drawing Sheets

(56) References Cited

U.S. PATENT DOCUMENTS

| | | | |
|---|---|---|---|
| 2014/0171139 A1* | 6/2014 | Liu | H04W 4/10 |
| | | | 455/518 |
| 2014/0222462 A1* | 8/2014 | Shakil | G06Q 50/22 |
| | | | 705/3 |
| 2014/0368601 A1* | 12/2014 | deCharms | H04W 4/021 |
| | | | 348/14.02 |
| 2015/0156030 A1* | 6/2015 | Fadell | H04L 12/2816 |
| | | | 700/90 |
| 2015/0222757 A1* | 8/2015 | Cheatham, III | H04M 11/025 |
| | | | 379/171 |
| 2016/0012194 A1* | 1/2016 | Prakash | G16H 50/20 |
| | | | 705/2 |
| 2016/0112554 A1 | 4/2016 | Shintani | |
| 2016/0234595 A1* | 8/2016 | Goran | H04R 3/002 |
| 2017/0075701 A1* | 3/2017 | Ricci | G01C 21/3484 |
| 2017/0083285 A1* | 3/2017 | Meyers | G10L 15/063 |
| 2017/0289486 A1* | 10/2017 | Stroffolino | H04N 5/44513 |
| 2017/0333790 A1* | 11/2017 | Champy | A63F 13/335 |
| 2018/0144101 A1* | 5/2018 | Bitran | G06F 19/3418 |
| 2018/0152736 A1* | 5/2018 | Alexander | H04N 21/2665 |
| 2019/0190908 A1* | 6/2019 | Shen | G06F 16/955 |

\* cited by examiner

LIST OF UNAUTHORIZED PERSONS NEARBY

|  | TEMPORARILY AUTHORIZE |
|---|---|
| PERSON 1 | ☐ |
| PERSON 2 | ☐ |
| PERSON 3 | ☑ |
| PERSON 4 | ☐ |

FIG.10

CONTROLLING VOICE INPUT BASED ON PROXIMITY OF PERSONS

BACKGROUND

1. Technical Field

Present invention embodiments relate to a computer system, a method and a computer program product for launching a voice input user interface when a user is to provide input to the computer system and no persons other than a person using the computer system are present within a proximity of the computer system.

2. Discussion of the Related Art

When a user provides input to a computer system, the input can often be provided more quickly and easily via a voice user interface than via a keyboard user interface due to improvements in speech recognition technology. This is particularly true when the computer system is a mobile, or handheld, computer system that does not have a full keyboard. In addition, the user may be uncomfortable providing voice input to a computer system when other people are nearby who may overhear what the user is saying. This is especially true when the voice input includes personal or confidential information that the user does not want others to hear. Due to habit, even when the user is alone, the user may use the slower keyboard user interface rather than the voice user interface to provide input to the computer system.

SUMMARY

According to a first aspect of embodiments of the invention, a method for controlling entry of input to a computer system is disclosed. A presence of a second person in a proximity of a computer system other than a first person using the computer system is determined. A user interface is automatically selected based on the determined presence of the second person. In an absence of the second person, a voice interface is selected. When the unauthorized person is present, a text entry interface is selected. The selected user interface is presented to the first person on a display of the computer system.

According to a second aspect of the embodiments of the invention, a computer system is provided. The computer system includes at least one processor and a memory connected to the at least one processor. The memory has instructions for the at least one processor stored therein. When the at least one processor executes the instructions, a presence of a second person in a proximity of the computer system other than a first person using the computer system is determined. A user interface is automatically selected based on the determined presence of the second person. A voice interface is selected in an absence of the second person. When the second person is present, a text entry user interface is selected. The selected user interface is presented to the first person on a display of the computer system.

According to a third aspect of the embodiments of the invention, a computer program product is provided. The computer program product includes at least one computer readable storage medium having computer readable program code embodied therewith for execution on at least one processor of a computer system. The computer readable program code is configured to be executed by the at least one processor to determine a presence of a second person in a proximity of the computer system other than a first person using the computer system and select a user interface automatically based on the determined presence of the second person. A voice interface is selected in an absence of the second person and a text entry interface is selected when the second person is present. The selected user interface is presented to the first person on a display of the computer system.

BRIEF DESCRIPTION OF THE DRAWINGS

Generally, like reference numerals in the various figures are utilized to designate like components.

FIG. 10 shows an example graphical user interface, according to some embodiments of the invention, which enables a user to select an unauthorized user to become a temporarily authorized user.

DETAILED DESCRIPTION

Figure 1:
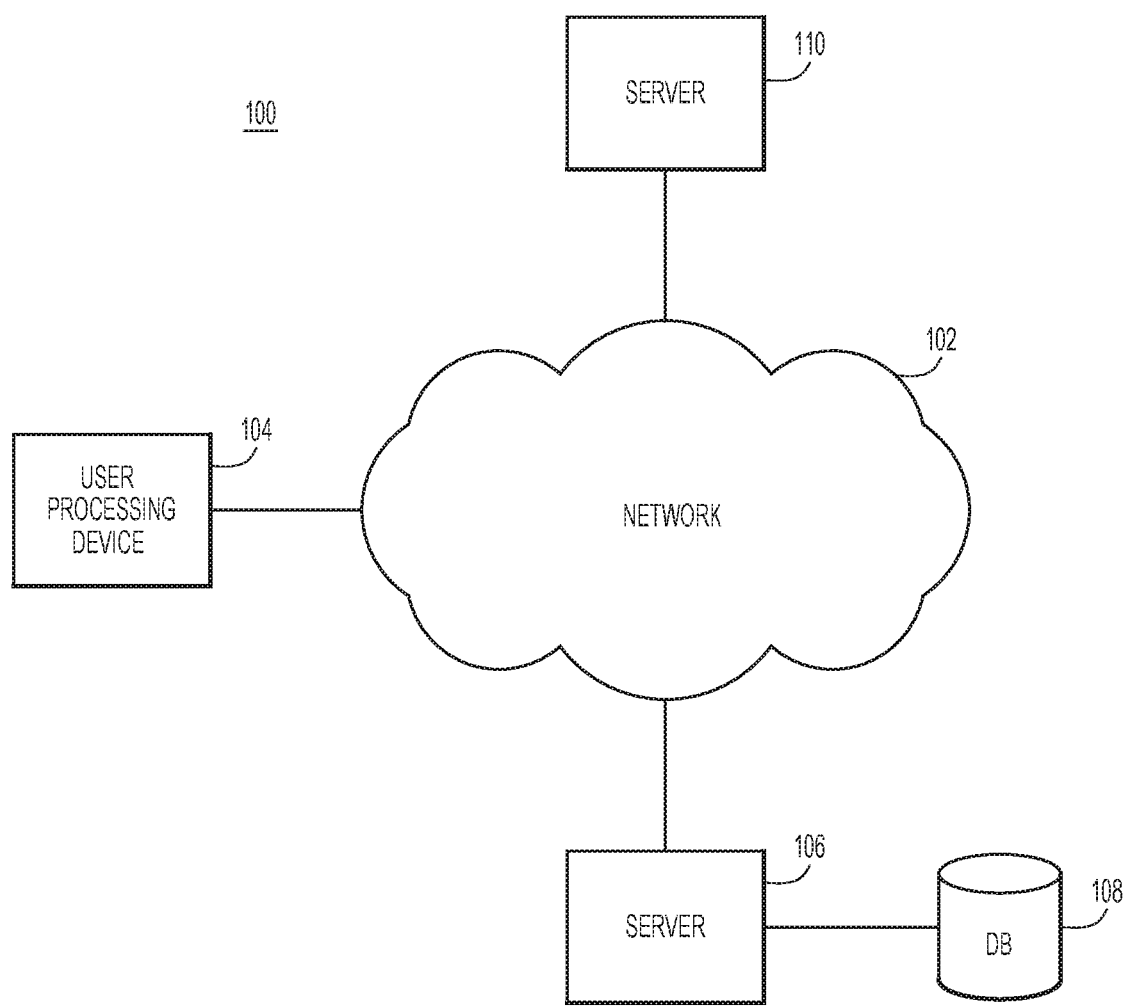
FIG. 1 illustrates an example environment in which embodiments of the invention may operate.

In various embodiments, a user of a computer system, which may include a mobile device, may be in a situation in which input is required by the computer system. The computer system may determine whether any persons other that a user using the computer system are within a proximity of the computer system. The proximity may be considered to be within a distance at which a person, other than the user of the computer system, may hear voice input provided by the user to the computer system.

If the person other than the user is determined to be within the proximity of the computer system, then a keyboard or other text entry user interface automatically may be provided for the user to provide input. If the computer system does not have an actual physical keyboard, the keyboard may be presented on a display screen of the computer system.

If the person other than the user is determined not to be within the proximity of the computer system, then a voice user interface automatically may be provided for the user to enter the input.

In some embodiments, instead of determining whether a person other than the user is in the proximity of the computer system, a determination may be made regarding whether an unauthorized person other than the user using the computer system is present within the proximity of the computer system.

In some embodiments, the computer system may determine a level of ambient noise by measuring a level of noise in audio input provided via a microphone of the computer system or via another audio input device. If the level of ambient noise exceeds a noise threshold, the computer system automatically may provide the keyboard as a selected user interface when the computer system requires input. If the level of ambient noise does not exceed the noise threshold and the computer system determined that no persons other than a user of the computer system are within the proximity of the computer system, then the computer system automatically may provide the voice user interface as the selected user interface when the computer system requires input. Alternatively, if the level of ambient noise does not exceed the noise threshold and the computer system determined that no unauthorized persons are within the proximity of the computer system, then the computer system automatically may provide the voice user interface as the selected user interface when the computer system requires input.

In some embodiments, the computer system may determine a current location and may determine whether a person other than a user of the computer system, or alternatively, whether an unauthorized person, is within a proximity of the computer system. If the computer system is determined to be in a first location from among a list of first locations, then when the computer system requires input and no person other than the user of the computer system, or alternatively, no unauthorized person, is within the proximity, the computer system automatically may present the voice user interface to the user. Otherwise, the computer system automatically may present the keyboard user interface to the user. In such embodiments, a predefined list of one or more first locations indicates locations at which the computer system automatically may present the voice user interface when no person other than the user of the computer system, or alternatively, no unauthorized person, is within the proximity of the computer system and input is required. A predefined list of one or more second locations indicates locations at which the computer system automatically may present the keyboard user interface when input is required regardless of whether any person other than the user, or alternatively, any unauthorized person, is within the proximity of the computer system.

In the various embodiments, when a voice input user interface is automatically selected, the user may change the input user interface to a keyboard input user interface, or other text entry input user interface if desired.

FIG. 1 illustrates an example environment 100 in which embodiments of the invention may operate. Example environment 100 may include a network 102 to which are connected, via a wired or a wireless connection, a user processing device 104, a server 106 and a server 110. User processing device 104 may include, but not be limited to, a mobile device such as, for example, a smartphone, a tablet computer, a laptop computer or a notebook computer. Server 106 may be being connected to, or have access to a database 108.

Network 102 may be implemented by any number of any suitable communications media (e.g., wide area network (WAN), local area network (LAN), Internet, Intranet, etc.) or a combination of any of the suitable communications media. Network 102 may further include wired and/or wireless networks.

Servers 106, 110 may include a desktop computer, a laptop computer, a mainframe computer, a tablet computer, or any other type of processing device. Database 108 may include any conventional database system. In some embodiments, database 108 may include information regarding whether an individual is authorized. When receiving voice input, user processing device 104 may process the voice input to produce text for transcripts in some embodiments. In other embodiments, user processing device 104 may transmit the voice input to server 110 via network 102. Server 110 may process the voice input to produce text for transcripts, which server 110 may transmit to user processing device 104 in response to receiving the voice input.

Figure 2:
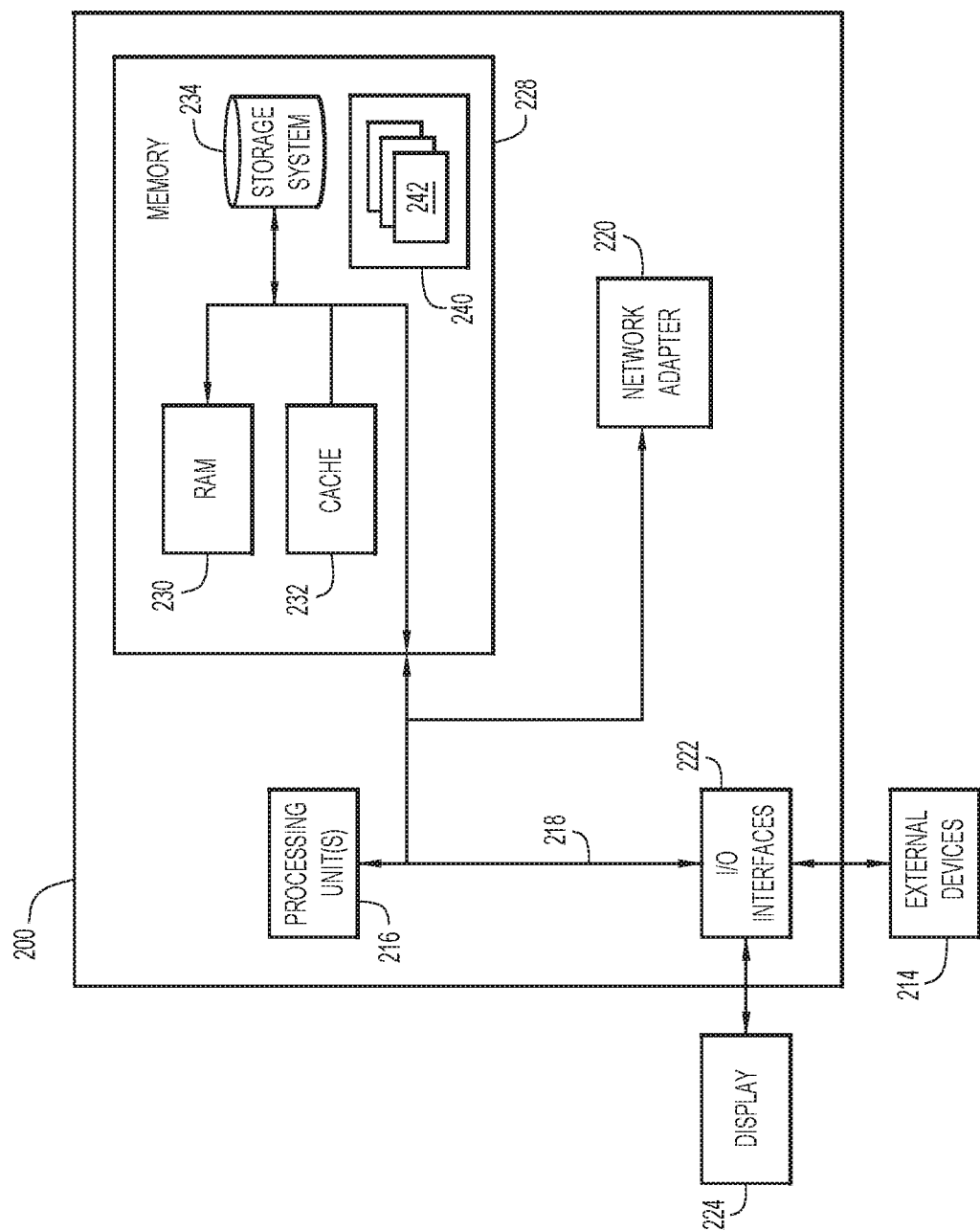
FIG. 2 is a functional block diagram of a computer system that may implement various embodiments of the invention.

Referring now to FIG. 2, a schematic of an example computer system 200 is shown. Computer system 200 may implement user processing device 104, server 106 and server 110. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: microcode, device drivers, redundant processing units, external disk drive arrays, RAID systems, tape drives, and data archival storage systems, etc.

In various embodiments, user processing device 104 may maintain subject matter information relating to a current use of user processing device 104. User processing device 104 may determine a subject matter based on any one or more of recently sent and received text messages or email messages, recently visited websites, a user's normal working hours and a current time of day, one or more recently used applications, and by reading an agenda associated with a current calendar entry, as well via other methods. For example, user processing device 104 may access database 108 via network 102 and server 106 and may determine that a current day of week and a current time of day correspond to the user's normal working hours and certain keywords used in a recent text or email include words related to a work project with which the user is associated. As another example, the user may be using an application on user processing device 104 that is associated with a work project of the user.

Figure 3:
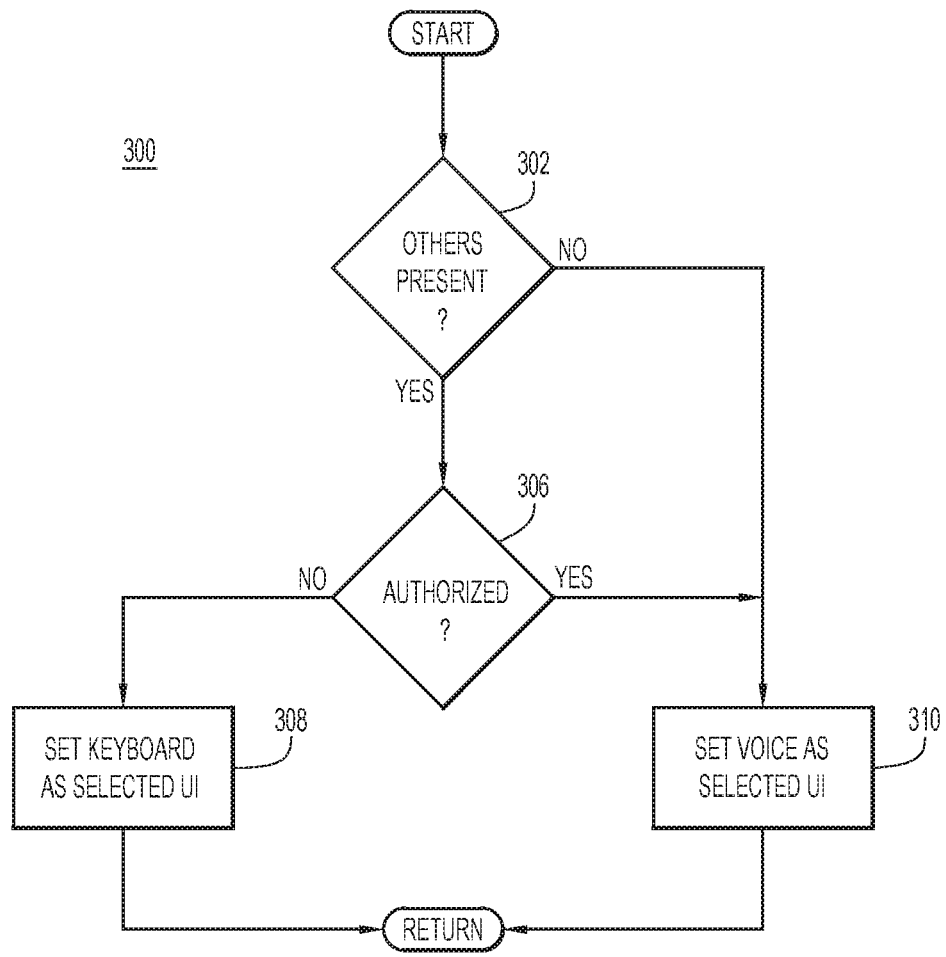
FIG. 3 is an example process, according to embodiments of the invention, for determining whether unauthorized persons are present in a proximity of a computer system and selecting either a keyboard user interface or a voice user interface based on whether an unauthorized person is determined to be present within the proximity.

FIG. 3 is a flowchart that illustrates an example process that may performed in embodiments of the invention to set a selected user interface to either a keyboard user interface or a voice user interface based on whether any unauthorized persons are in a proximity of user processing device 104. The process may begin with user processing device 104 determining whether any persons other than a user of user processing device 104 are present in a proximity of user processing device 104 (acts 302). The determination may be made in a number of different ways. For example, each person may carry a processing device that may be included in a smart phone, an employee badge, or other portable processing device. User processing device 104 may broadcast a query to all processing devices within the proximity. The query may be broadcast via any one of a number of wireless technologies used for transmitting information including, but not limited to, Bluetooth® (Bluetooth is a registered trademark of Bluetooth Sig., Inc., a Delaware corporation), Near-Field Communication (NFC), and Wi-Fi. Each respective processing device that receives the query may transmit a response to user processing device 104 along with information identifying a person associated with the respective processing device. User processing device 104 may transmit the received information along with subject matter information to server 106 via network 102. Server 106 may then determine an identity of the person and whether the person is authorized to hear information pertaining to the subject matter identified in the subject matter information. Server 106 may then transmit a message to user device 104 through network 102 indicating whether the person is or is not authorized.

In another embodiment, user processing device 104 may include at least one camera. In some implementations, user processing device 104 may include a forward facing camera and a rear facing camera. If one or more persons are observed by the at least one camera, user processing device 104 may transmit images of the one or more observed persons to server 106 along with the subject matter information. Server 106 may include facial recognition software and, if the transmitted images include facial images, server 106 may use facial recognition software to identify the one or more observed persons and determine whether the one or more observed persons are authorized to hear information pertaining to a subject matter indicated by the determined current subject matter information.

In yet another embodiment, user processing device 104 may listen for sounds made by human voices. If a human voice, other than that of the user of user processing device 104, is heard, user processing device 104 may transmit voice information regarding the heard human voice to server 106, which may identify a person associated with the transmitted voice information. Server 106 may then access database 108 to determine whether the person is authorized to hear information pertaining to the determined current subject matter and may transmit a message, via network 102, to user processing device 104 indicating whether the person is or is not authorized to hear information pertaining to the subject matter.

In other embodiments, user processing device 104 may include information such that user processing device 104 may identify a person as being authorized or unauthorized without having to contact another device such as, for example, server 106.

In alternative embodiments, instead of identifying a particular person, a role of the particular person with respect to the subject matter may be determined either by user processing device 104 or by server 106, which may determine whether the person is authorized to hear information pertaining to the subject matter based on the determined role.

In yet other alternative embodiments, instead of identifying a particular person or a role of the particular person, user processing device 104 or server 106 may determine whether the particular person is associated with an entity or a group, and whether the entity or the group is authorized to hear information pertaining to the subject matter indicated by the subject matter information.

Other embodiments may include other methods of determining whether a person is or is not authorized to hear information pertaining to the subject matter indicated by the subject matter information.

Returning to FIG. 3, if other persons are determined to be present within the proximity, then a determination may be made regarding whether all of the other persons are authorized to hear information regarding the subject matter (act 306), as previously discussed. If at least one of the other persons present in the proximity is determined not to be authorized, then user processing device 104 may set the keyboard as the selected user interface (act 308). Otherwise, user processing device 104 may set voice as the selected user interface (act 310). If, during act 302, no other persons, other than the user, are determined to be present in the proximity, then the user processing device 104 may set voice as the selected user interface (act 310).

As an alternative embodiment, instead of determining whether an authorized or unauthorized person is present within the proximity of user processing device 104, user processing device may determine whether a person other a user using user processing device 104 is present within the proximity of user processing device 104. If the person is not present, then voice input may be set as the selected input user interface, otherwise, a keyboard user interface, or other text entry user interface, may be set as the selected user interface.

In some embodiments, the process of FIG. 3 may be performed periodically such as, for example, every 10 seconds, every 60 seconds, every 30 seconds, or another suitable period of time. If the user is currently providing voice input when user processing device 104 determines that an unauthorized person is detected in the proximity, then an automatic switch to text entry input may occur, as may be indicated by a display screen of user processing device 104. Alternatively, a notice may be displayed on the display screen or an audio indication may be provided by user processing device 104 to inform the user that an unauthorized person is in the proximity. After informing the user about the unauthorized person in the proximity, user processing device 104 may ask the user whether the user desires to switch to keyboard input or to continue with voice input. User processing device 104 then may switch to the keyboard input if the user indicates the desire to switch to the keyboard input.

Figure 4:
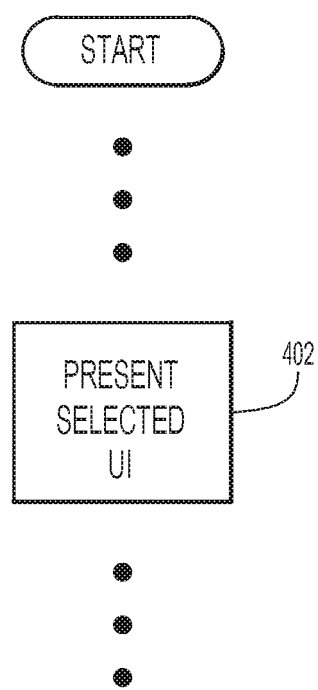
FIG. 4 shows a flowchart of an example process in which a selected user interface is presented to a user according to embodiments of the invention.

FIG. 4 illustrates that when the user input is required by user processing device 104, the selected user interface is presented on a display screen of user processing device 104 (act 402). The selected user interface may be, for example, either the keyboard or the voice user interface.

Figure 5:
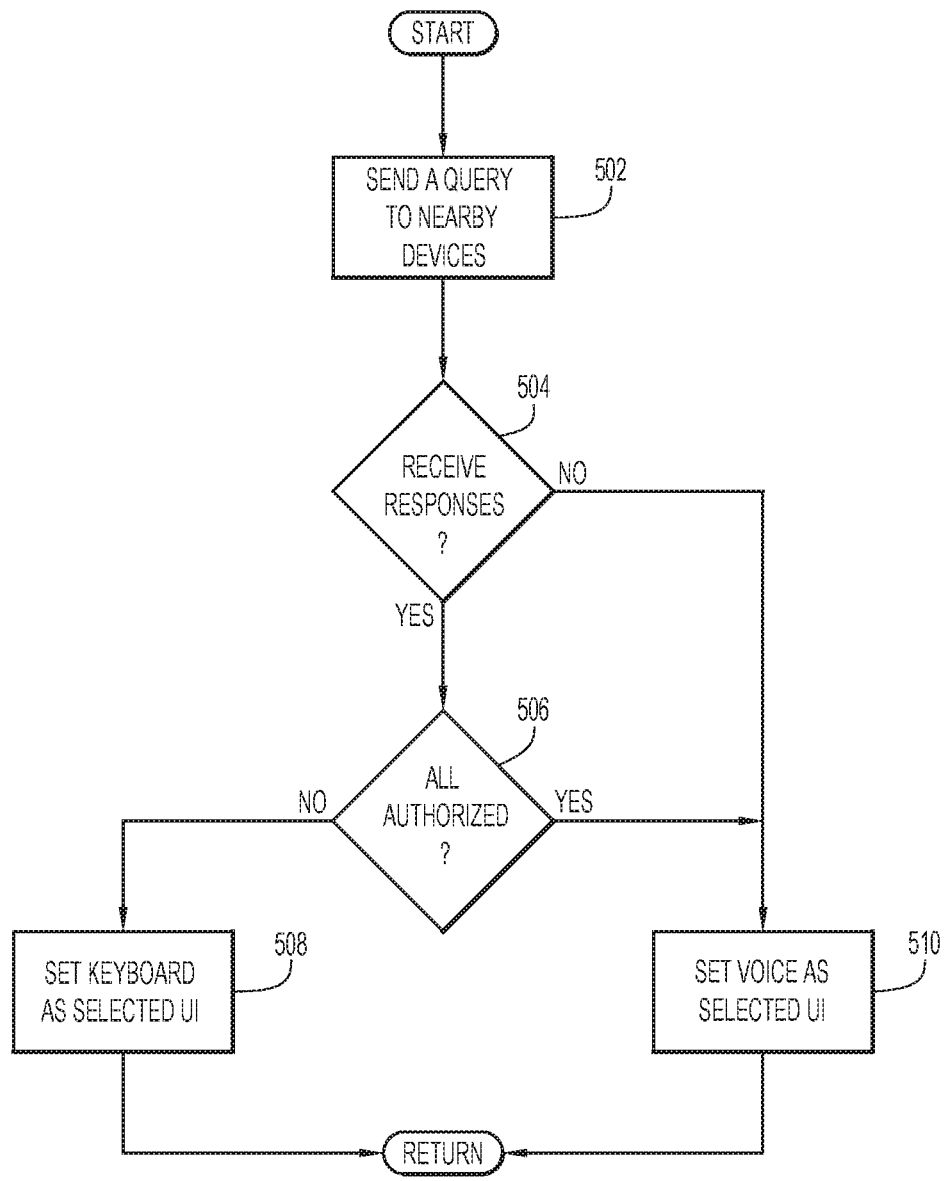
FIG. 5 is a flowchart that illustrates an example process, according to embodiments of the invention, for querying nearby devices to determine a presence of an unauthorized user in a proximity of a computer system and setting a selected user interface based on the determined presence of the unauthorized user or lack thereof.

FIG. 5 is a flowchart of an example process for determining the presence of other persons in the proximity and further for determining whether all the other persons present in the proximity are authorized to hear the subject matter. User processing device 104 may periodically perform the process of FIG. 5. The process may begin with user processing device 104 broadcasting a query to the nearby devices within the proximity (act 502). The query may be broadcast via any one of a number of methods including, but not limited to, Bluetooth, near-field communication, and Wi-Fi. User processing device 104 may receive responses to the query from the nearby devices (act 504), which may include, but not be limited to, smartphones, tablet computers, laptop computers, and employee badges. The responses may include information from which user processing device 104 may determine whether a person associated with each of the nearby devices is authorized to hear the subject matter to be input. In some embodiments, user processing device 104 may communicate with server 106 and database 108 via network 102 to make this determination, as previously discussed.

If, during act 504, user processing device 104 determines that no responses are received from the nearby devices, then user processing device 104 may set voice as the selected user interface (act 510). Otherwise, user processing device 104 may determine, based on the received responses, whether all of the responding nearby devices are associated with persons authorized to hear the subject matter (act 506). If all of the nearby devices are associated with persons authorized to hear the subject matter, then user processing device 104 may set voice as the selected user interface. Otherwise, user processing device 104 may set keyboard input as the selected input user interface (act 510).

Figure 6:
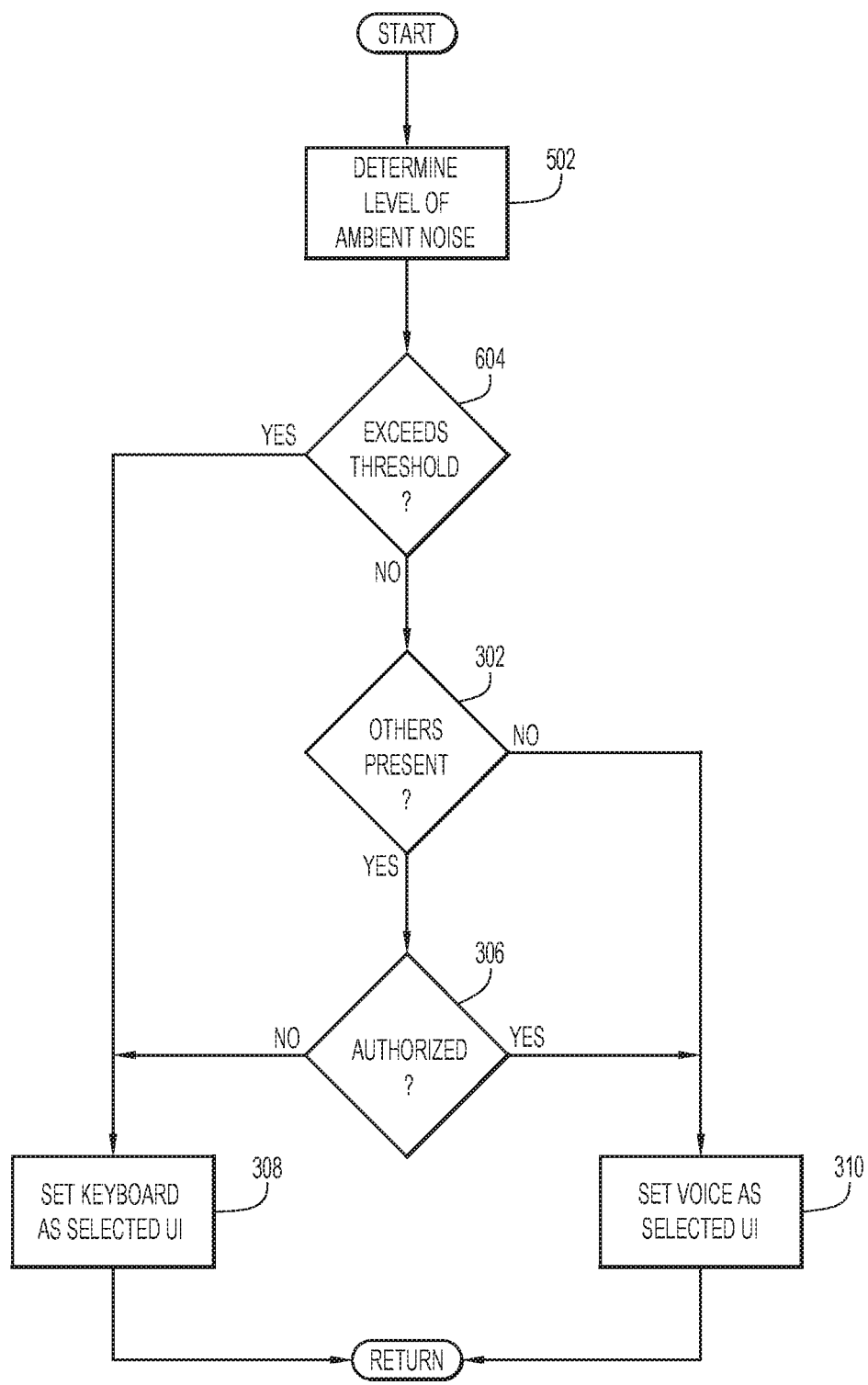
FIG. 6 is a flowchart of an example process, according to an embodiment of the invention, in which a keyboard is selected as the user interface when an ambient noise level exceeds a noise threshold.

In some embodiments, in addition to determining whether only authorized persons are present in the proximity, user processing device 104 may determine a level of ambient noise and may set the keyboard as the selected user interface when the level of ambient noise is determined to be greater than a noise threshold. FIG. 6 is a flowchart of an example process that may be performed in such embodiments.

The process may begin with user processing device 104 listening, via a microphone or other audio input device, to determine a current level of ambient noise (act 602). User processing device 104 may then compare the level of ambient noise with a noise threshold to determine whether the level of ambient noise exceeds the noise threshold (act 604). If the level of ambient noise is determined to exceed the noise threshold, then user processing device 104 may set the keyboard as the selected user interface (act 308). Otherwise, user processing device 104 may determine whether any people, other than the user, are present within the proximity (act 302) using any of the methods previously described or other methods. Acts 302-310 were described previously with reference to FIG. 3.

As an alternative embodiment, instead of determining whether an authorized or unauthorized person is present within the proximity of user processing device 104, user processing device may determine whether a person other a user using user processing device 104 is present within the proximity of user processing device 104. If the person is not present and a level of ambient noise does not exceed a threshold, then voice input may be set as the selected input user interface, otherwise, a keyboard user interface or other text entry user interface may be set as the selected user interface.

In some embodiments, the process of FIG. 6 may be performed periodically such as, for example, every 10 seconds, every 60 seconds, every 30 seconds, or another suitable period of time. If the user is currently providing voice input when user processing device 104 determines that the level of ambient noise exceeds the noise threshold or the unauthorized person, or alternatively, a person other than the user using user processing device 104, is detected in the proximity, then an automatic switch to text entry input may occur, as may be indicated by a display screen of user processing device 104. Alternatively, a notice may be displayed on the display screen or an audio indication may be provided by user processing device 104 to inform the user that either the level of ambient noise exceeds the noise threshold or the unauthorized person (or alternatively, the person other than the user) is in the proximity. After informing the user about either the level of ambient noise being exceeded or the unauthorized person (or the person other than the user) in the proximity, user processing device 104 may ask the user whether the user desires to switch to text entry input or continue with voice input. User processing device 104 then may switch to the text entry input if the user indicates the desire to switch to the text entry input.

Figure 7:
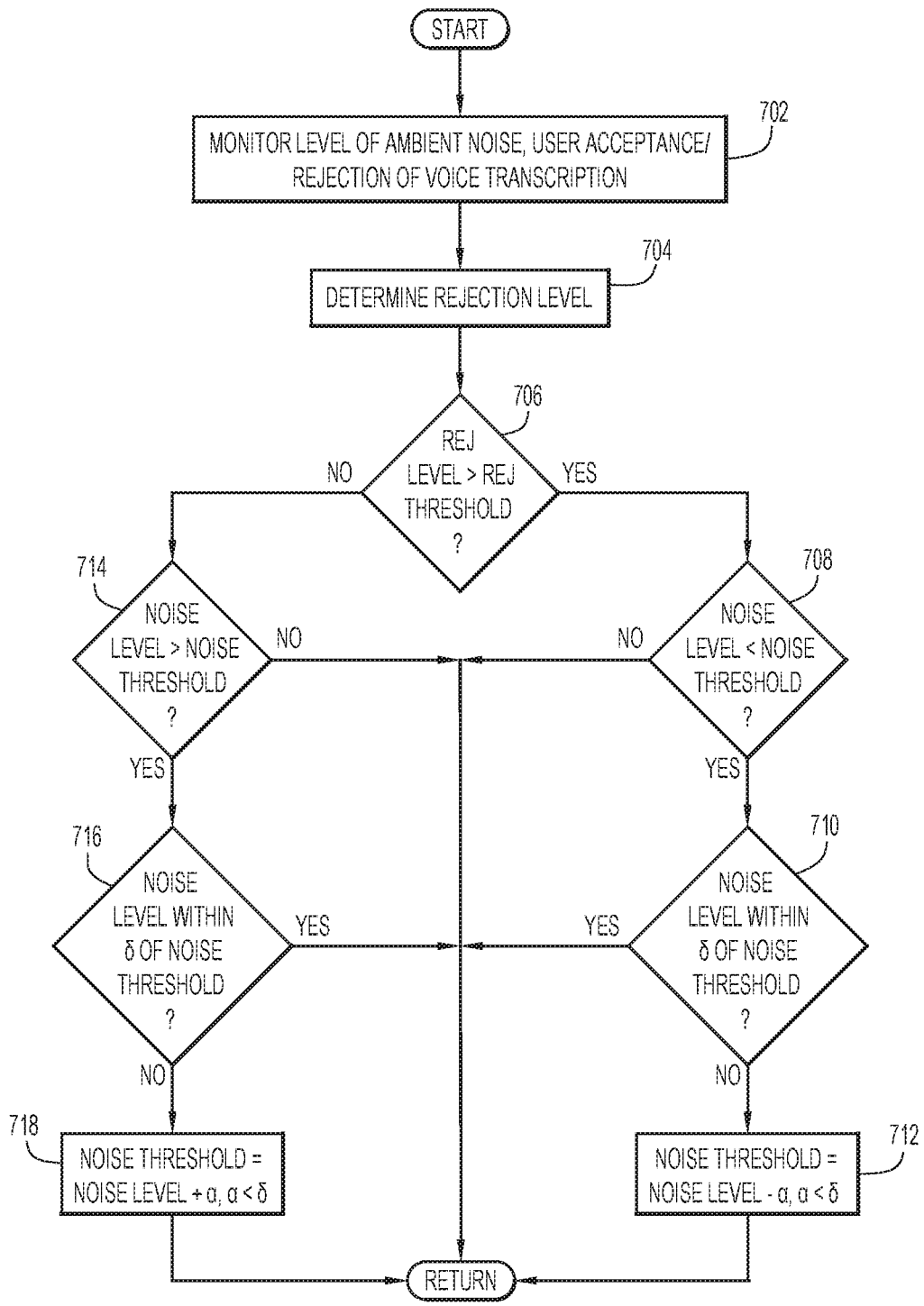
FIG. 7 shows a flowchart of an example process, according to some embodiments of the invention, for adjusting an ambient noise threshold for accepting voice input based on whether a rejection level of voice transcripts of voice input exceeds a rejection threshold.

When providing voice input, some users may speak loudly and clearly while other users may speak softly. Those users who speak loudly and clearly may be able to provide voice input at a higher level of ambient noise than those users who speak softly. In some embodiments, user processing device 104 may monitor a level of ambient noise and a rejection level with respect to voice transcription. The rejection level may be determined based on how often a user corrects a voice transcription. In such embodiments, when the rejection level exceeds a rejection threshold while a level of ambient noise is less than a noise threshold, the noise threshold may be decreased to better conform with the rejection threshold. If the rejection level is not greater than the rejection threshold while the level of ambient noise is greater than the noise threshold, the noise threshold may be increased to better conform with the rejection level. Thus, the noise threshold is adjusted for the user according to the rejection threshold and the user's voice input. FIG. 7 is a flowchart of an example process in such an embodiment.

The process may begin with user processing device 104 monitoring a level of ambient noise via an audio input device including, but not limited to, a microphone, and a level of user acceptance/rejection of voice transcription of voice input (act 702). User processing device 104 may then determine a rejection level of the voice transcription (act 704) and whether the rejection level is greater than a rejection threshold (act 706). If the rejection level is determined to be greater than the rejection threshold, then user processing device 104 may determine whether an ambient noise level is less than a noise threshold (act 708). If the ambient noise level is determined to be less than the noise threshold, then user processing device 104 may determine whether the ambient noise level is within a preset amount, δ, of the noise threshold (act 710). This is done in order to prevent the noise threshold from being continually changed when the noise level remains close to the noise threshold such as, for example, within δ of the noise threshold. If the ambient noise level is determined to be within δ of the noise threshold, then the noise threshold may remain unchanged. Otherwise, the noise threshold may be decreased by an amount, a, which may be less than δ (act 712).

If, during act 708, user processing device 104 determines that the ambient noise level is not less than the noise threshold, then the noise threshold may remain unchanged.

If, during act 706, user processing device 104 determines that the rejection level is not greater than the rejection threshold, then user processing device 104 may determine whether the ambient noise level is greater than the noise threshold (act 714). If the ambient noise level is determined to be greater than the noise threshold, then user processing device may determine whether the ambient noise level is within δ of the noise threshold (act 716). If the ambient noise level is within δ of the noise threshold, then the noise threshold will remain unchanged. Otherwise, user processing device 104 may set the noise threshold to the ambient noise level+α (act 718).

If, during act 714, the ambient noise level is determined to be not greater than the noise threshold, then the noise threshold may remain unchanged.

The above-mentioned process of FIG. 7 may be performed periodically such as, for example, every 60 seconds, every 2 minutes, every 5 minutes, or another suitable time interval.

Figure 8:
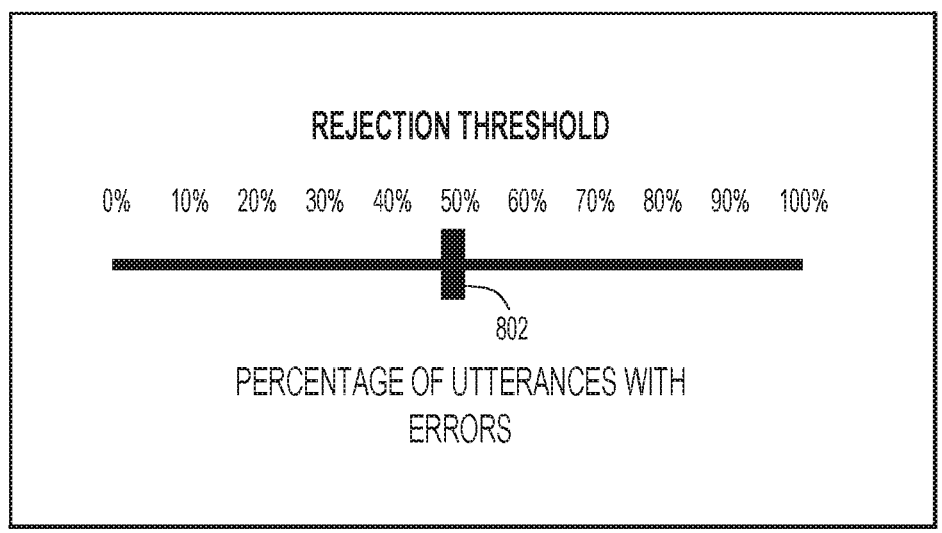
FIG. 8 is an example graphical user interface, according to some embodiments of the invention, for adjusting the rejection threshold of voice transcripts.

FIG. 8 shows an example graphical user interface (GUI), which user processing device 104 may display, in some embodiments, when the user wishes to change the rejection threshold with respect to voice transcription errors. The user may select an indicator 802 with a pointing device and may drag indicator 802 to a desired rejection threshold. In some embodiments, a user's finger may be the pointing device. In other embodiments, other user interfaces may be used to change the rejection threshold. In this specification, an utterance is defined as a spoken group of one or more words delimited by a pause of at least a preset amount of time such as, for example, 2 seconds, 5 seconds, or another suitable amount of time. A rejection threshold of, for example, 50%, is exceeded when transcriptions corresponding to more than 50% of the utterances were corrected by the user.

Figure 9:
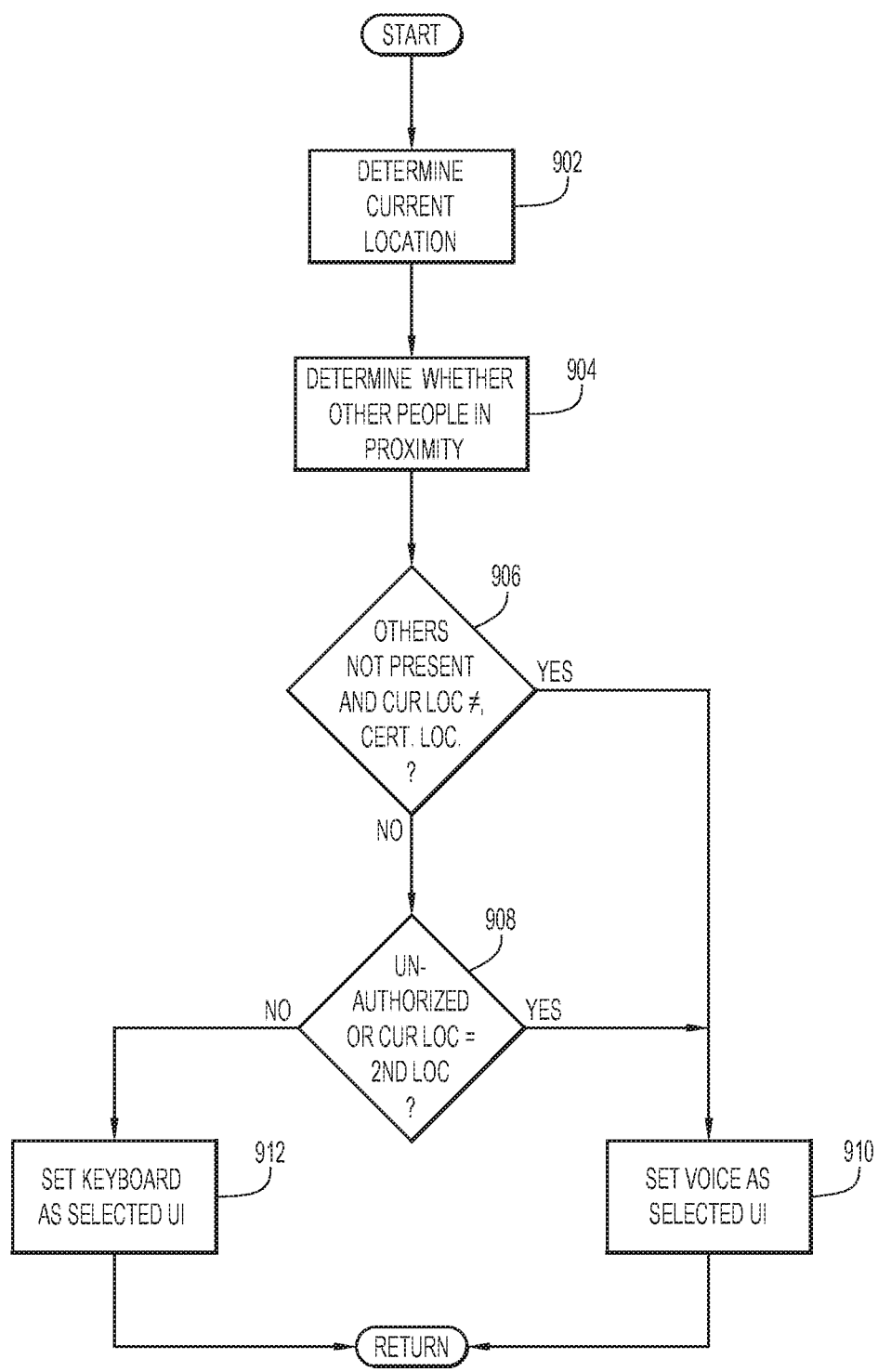
FIG. 9 as a flowchart of an example process, according to some embodiments of the invention, for determining a location and selecting a keyboard as a selected user interface when the location is determined to be a location among multiple locations at which voice input is not to be selected as the selected user interface.

In some embodiments, if user processing device 104 is located within any certain location, user processing device 104 may set the selected user interface to the keyboard user interface regardless of whether unauthorized persons are within the proximity. The certain locations may be public locations such as, for example, a company cafeteria, a shopping mall, etc. If user processing device 104 is determined to be in a location other than any of the certain locations, then the selected user interface may be set to the voice input user interface only when no unauthorized persons (or, alternatively, no persons other than the user of user processing device 104) are in the proximity. Otherwise, the selected user interface may be set to the keyboard user interface. FIG. 9 is a flowchart of an example process that may be performed by user processing device 104 in such an embodiment.

The process may begin with user processing device 104 determining a current location (act 902). This may be performed in any one of a number of ways. For example, user processing device 104 may determine a current location by communicating with multiple Global Positioning System (GPS) satellites. In some embodiments, user processing device 104 may determine a current location by measuring signal strengths at nearby base stations. Other embodiments, may employ other methods of determining a current location.

User processing device 104 may determine whether other people are in the proximity of user processing device 104 (act 904). If other people are determined to be not present within the proximity and the current location is not any of a number of the second locations (act 906), then user processing device 104 may select voice as the selected input user interface (act 910).

If, during act 906, user processing device 104 determines that either at least one other person is present within the proximity or the current location is one of the certain locations, then if any of the at least one other person is determined to be unauthorized or the current location is determined to be one of the certain locations (act 908), the keyboard may be set as the selected user interface (act 912). Otherwise, voice may be set as the selected user interface (act 910).

In some embodiments, a user of user processing device 104 may temporarily authorize an unauthorized person in the proximity. The authorization may expire after a period of time. For example, the authorization may expire at an end of a day, after four hours, after two hours, or after another suitable period of time. In some implementations, the authorization may expire after completion of providing input to an application such as, for example, a text messaging application, an email application, a word processing application or other application.

FIG. 10 shows an example graphical user interface which may be displayed on a display of user processing device 104 in order to temporarily authorize a person in the proximity of user processing device 104. FIG. 10 shows four currently unauthorized persons who are in the proximity of the user processing device 104. The unauthorized persons are Person 1, Person 2, Person 3, and Person 4. On a right side of FIG.

10 is a column of checkboxes. A user may select, with a pointing device, a checkbox corresponding to the unauthorized person that the user wishes to temporarily authorize. Upon selecting a desired checkbox, a checkmark may be displayed confirming that the corresponding person is now temporarily authorized.

It will be appreciated that the embodiments described above and illustrated in the drawings represent only a few of the many ways of implementing various embodiments of the invention.

The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various computer systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures to store information. The database system may be included within or coupled to server and/or client systems. The database systems and/or storage structures may be remote from or local to a computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figs. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for controlling entry of input to a computer system, the method comprising:
   when voice input is being provided via a voice interface:
      learning, by the computer system, a level of ambient noise that is acceptable based on the voice input provided by a first person using the computer system, and
      adjusting, by the computer system, a threshold for the ambient noise based on the learned level of ambient noise that is acceptable;
   determining, by the computer system, a presence of an unauthorized person in a proximity of the computer system, the determining comprising:
      transmitting, by the computer system, a query to devices associated with any persons in the proximity of the computer system other than the first person, and
      receiving, by the computer system, a response from each of the devices associated with the any persons in response to the transmitting of the query, each responding device providing information that is usable in determining whether a respective person associated with the responding device is the unauthorized person;
   selecting a user interface automatically by the computer system, wherein the computer system automatically selects the voice interface when the computer system determines the unauthorized person is absent and detects that the ambient noise does not exceed the threshold, and the computer system automatically selects a text entry interface when the computer system determines the unauthorized person is present and also automatically selects the text entry interface when the computer system detects the ambient noise exceeding the threshold while the voice input is being provided;

presenting, the first person using the computer system, the selected user interface; and when the presence of the unauthorized person is determined, temporarily authorizing the detected unauthorized person in response to receiving a request from the first person.

2. The method of claim 1, wherein the provided information from the each of the devices includes a group or an entity to which a respective person associated with the device belongs.

3. The method of claim 1, wherein the provided information from the each of the devices includes a role of a respective person associated with the device.

4. The method of claim 1, wherein the selecting the user interface further comprises:

determining, by the computer system, a current location of the computer system; selecting the text entry user interface automatically in response to the determined current location being one of at least one certain location.

5. A computer system comprising:

at least one processor; and a memory connected to the at least one processor, the memory having instructions for the at least one processor stored therein such that when the at least one processor executes the instructions, the at least one processor is configured to perform:

when voice input is being provided via a voice interface:

learning a level of ambient noise that is acceptable based on the voice input provided by a first person using a computer system, and adjusting a threshold for the ambient noise based on the learned level of ambient noise that is acceptable;

determining a presence of an unauthorized person in a proximity of the computer system, the determining comprising:

transmitting a query to devices associated with any persons in the proximity of the computer system other than the first person, and receiving a response from each of the devices associated with the any persons in response to the transmitting of the query, each responding device providing information that is usable in determining whether a respective person associated with the responding device is the unauthorized person;

selecting a user interface automatically, wherein the voice interface is automatically selected when the unauthorized person is determined to be absent and the ambient noise is detected as not exceeding the threshold, the text entry interface is automatically selected when the unauthorized person is determined to be present, and the text entry interface is automatically selected when the ambient noise is detected as exceeding the threshold while the voice input is being provided;

presenting, to the first person using the computer system, the selected user interface; and when the presence of the unauthorized person is determined, temporarily authorizing the detected unauthorized person in response to receiving a request from the first person.

6. The computer system of claim 5, wherein:

the provided information from the each of the devices includes at least one of a role of a respective person associated with the device, a group to which the respective person associated with the device belongs, and an entity to which the respective person associated with the device belongs.

7. The computer system of claim 5, wherein the selecting the user interface further comprises:

determining a current location of the computer system, and selecting the text entry user interface automatically in response to the determined current location being one of at least one certain location.

8. A computer program product comprising at least one computer readable storage medium having computer readable program code embodied therewith for execution on at least one processor of a computer system, the computer readable program code being configured to be executed by the at least one processor to perform:

when voice input is being provided via a voice interface:

learning a level of ambient noise that is acceptable based on the voice input provided by a first person using the computer system, and adjusting a threshold for the ambient noise based on the learned level of ambient noise that is acceptable;

determining a presence of an unauthorized person in a proximity of the computer system, the determining further comprising:

transmitting a query to devices associated with any persons in the proximity of the computer system other than the first person, and receiving a response from each of the devices associated with the any persons in response to the transmitting of the query, eachresponding device providing information that is usable in determining whether a respective person associated with the responding device is the unauthorized person;

selecting a user interface automatically, wherein the voice interface is automatically selected when the unauthorized person is determined to be absent and the ambient noise is detected as not exceeding the threshold, the text entry interface is automatically selected when the unauthorized person is determined to be present, and the text entry interface is automatically selected when the ambient noise is detected as exceeding the threshold while the voice input is being provided;

presenting the selected user interface to the first person using the computer system; and when the presence of the unauthorized person is determined, temporarily authorizing the detected unauthorized person in response to receiving a request from the first person.

* * * * *